United States Patent
Kishiyama et al.

(10) Patent No.: US 9,167,533 B2
(45) Date of Patent: Oct. 20, 2015

(54) BASE STATION APPARATUS, USER EQUIPMENT, AND METHOD USED IN MOBILE COMMUNICATION SYSTEM

(75) Inventors: Yoshihisa Kishiyama, Yokosuka (JP); Kenichi Higuchi, Yokohama (JP); Mamoru Sawahashi, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 807 days.

(21) Appl. No.: 12/521,973

(22) PCT Filed: Dec. 26, 2007

(86) PCT No.: PCT/JP2007/075019
§ 371 (c)(1),
(2), (4) Date: Sep. 3, 2009

(87) PCT Pub. No.: WO2008/084700
PCT Pub. Date: Jul. 17, 2008

(65) Prior Publication Data
US 2010/0103867 A1    Apr. 29, 2010

(30) Foreign Application Priority Data

Jan. 9, 2007 (JP) ................................ 2007-001857
Feb. 5, 2007 (JP) ................................ 2007-026183

(51) Int. Cl.
*H04W 52/14* (2009.01)
*H04W 52/16* (2009.01)
(Continued)

(52) U.S. Cl.
CPC ............ *H04W 52/146* (2013.01); *H04W 52/16* (2013.01); *H04W 52/24* (2013.01); *H04W 52/325* (2013.01); *H04W 52/365* (2013.01)

(58) Field of Classification Search
USPC .......... 370/315, 311, 329, 332, 341; 455/13.4
See application file for complete search history.

(56) References Cited

U.S. PATENT DOCUMENTS

2004/0193971 A1* 9/2004 Soong et al. ................... 714/704
2007/0047452 A1* 3/2007 Lohr et al. ..................... 370/242
(Continued)

FOREIGN PATENT DOCUMENTS

EP     1 892 854 A1    2/2008
JP     2005-525057 A   8/2005
(Continued)

OTHER PUBLICATIONS

3GPP TS 25.214 V3.12.0 (Mar. 2003) Technical Specification; 3rd Generation Partnership Project; Technical Specification Group Radio Access Network; Physical layer procedures (FDD); (Release 1999).*

(Continued)

*Primary Examiner* — Kodzovi Acolatse
(74) *Attorney, Agent, or Firm* — Osha Liang LLP

(57) ABSTRACT

A base station apparatus for a mobile communication system is disclosed that includes a unit to receive an uplink reference signal transmitted from user equipment, a unit to provide transmission power control data indicating whether a transmission power value of the uplink reference signal to be transmitted later is to be changed, a unit to derive a first offset power value so that the uplink control signal is transmitted at a power value determined by adding the first offset power value to the transmission power value of the uplink reference signal, a unit to derive a second offset power value so that the uplink control signal is transmitted at a power value determined by adding the second offset power value to the transmission power value of the uplink reference signal, and a unit to report the data and values to the user equipment.

3 Claims, 10 Drawing Sheets

(51) Int. Cl.
*H04W 52/32* (2009.01)
*H04W 52/24* (2009.01)
*H04W 52/36* (2009.01)

(56) References Cited

U.S. PATENT DOCUMENTS

2008/0039098 A1* 2/2008 Papasakellariou et al. ... 455/442
2008/0045260 A1* 2/2008 Muharemovic et al. ...... 455/522

FOREIGN PATENT DOCUMENTS

| | | | |
|---|---|---|---|
| JP | 2006-197318 | A | 7/2006 |
| WO | 2006051481 | A2 | 5/2006 |
| WO | 2006054721 | A1 | 5/2006 |
| WO | 2006/134945 | A1 | 12/2006 |

OTHER PUBLICATIONS

International Search Report w/translation from PCT/JP2007/075019 dated May 1, 2008 (2 pages).
Written Opinion from PCT/JP2007/075019 dated May 1, 2008 (3 pages).
3GPP TS 25.214 V3.12.0; "Physical Layer Procedures (FDD)"; Mar. 2003; pp. 11-15 (5 pages).
Japanese Office Action for Application No. 2007-026183, mailed on Jul. 26, 2011 (6 pages).
Texas Instruments, "Multiplexing of Distributed ("Sounding") Reference Signals for CQI Measurement and Scheduling in EUTRA Uplink," 3GPP TSG RAN WG1 #47, R1-063230, Riga, Latvia, Nov. 6-10, 2006.
Lucent Technologies, "Intra-Cell Power Control for the E-UTRA Uplink," 3GPP TSG RAN WG1 #47, R1-063477, Riga, Latvia, Nov. 6-10, 2006.
Japanese Office Action for Application No. 2007-026183, mailed on Feb. 22, 2011 (5 pages).
Extended European Search Report issued in corresponding European Application No. 07860248.9 dated Mar. 4, 2013 (10 pages).
LG Electronics, "Text proposal for TFCI power control requirement, "3GPP TSG RAN WG1 #27, TSG R1-01-0805, Turing, Italy, Aug. 27-31, 2001 (3 pages).
3GPP TS 25.214 V6.5.0; "3rd Generation Partnership Project; Technical Specification Group Radio Access Network; Physical layer procedures (FDD) (Release)"; Mar. 2005 (69 pages).
Office Action issued in corresponding Canadian application 2,673,383 ; dated Jun. 13, 2014 (4 pages).
Office Action in counterpart Chinese Patent Application No. 201210461799.5, Jul. 29, 2014 (13 pages).
Office Action in the corresponding European Patent Application No. 07860248.9, mailed Jan. 15, 2015 (7 pages).

\* cited by examiner

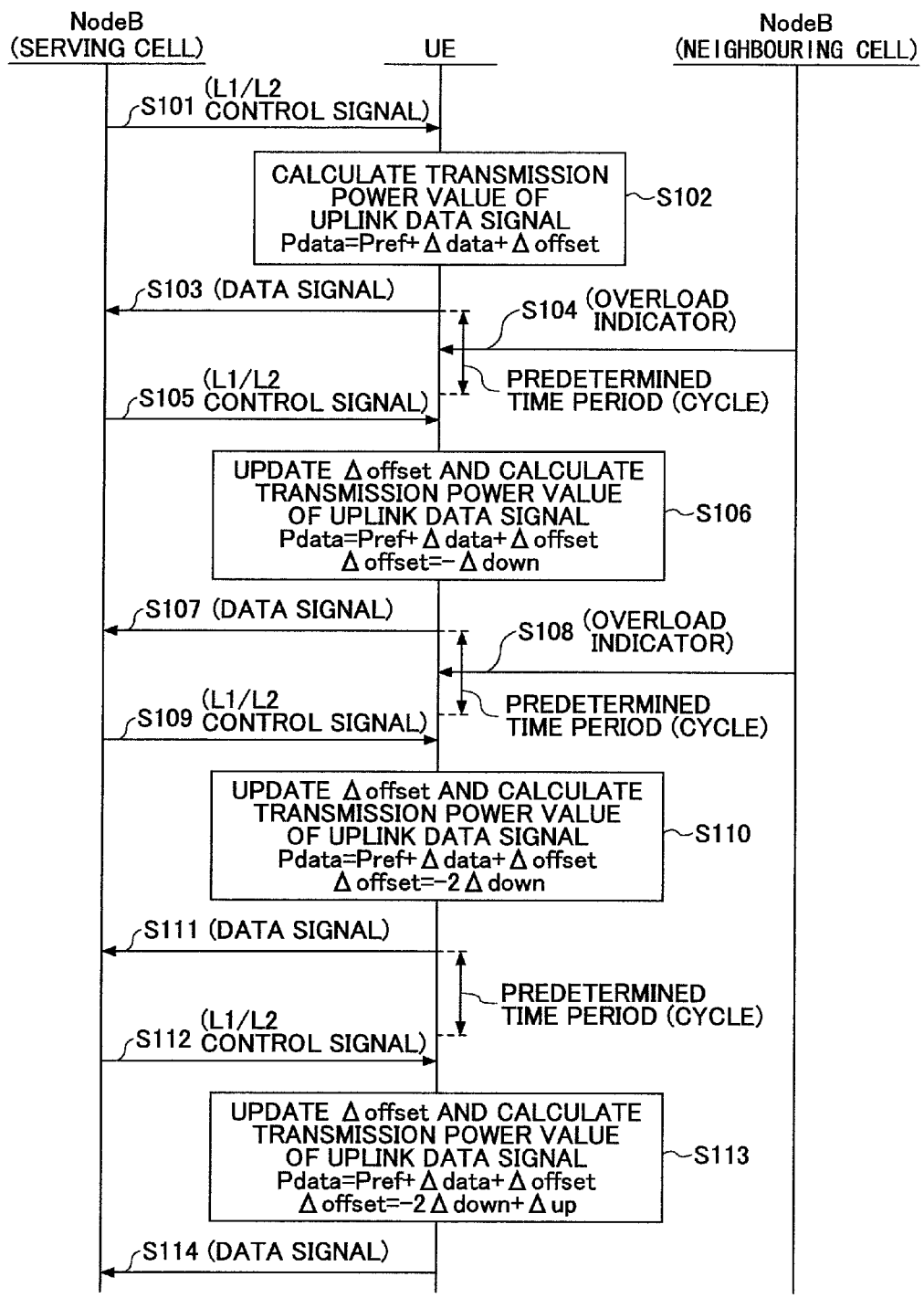

BASE STATION APPARATUS, USER EQUIPMENT, AND METHOD USED IN MOBILE COMMUNICATION SYSTEM

TECHNICAL FIELD

The present invention relates to a base station, user equipment, and a method used in a mobile communication system.

BACKGROUND ART

FIG. 1 schematically shows a conventional mobile communication system. For example, the system may be a circuit-switched type mobile communication system employing the W-CDMA (Wideband-Code Division Multiple Access) method. As shown in FIG. 1, it is assumed that each of the user equipment (hereinafter may be referred to as a user equipment terminal) UE1, UE2, and UE3 is in communication with the base station apparatus (BS1) of the cell1 using the corresponding dedicated line assigned to the user equipment terminals. The base station apparatus may be referred to as base station (BS) or NodeB. In this case, a transmission signal of a user equipment terminal may become an interference signal for any other user equipment terminals and other base station (such as BS2 in the example of FIG. 1) as well. Therefore, it is necessary to adequately control the transmission power (more precisely, transmission power density),—more particularly, uplink transmission power density. As is generally known, by multiplying the transmission power (transmission power density) per unit bandwidth by the bandwidth, it is possible to calculate total transmission power assigned to the signal transmissions used in the bandwidth. It is power density rather than the total transmission power that directly interferes with the signals. Herein, basically, the term "power" refers to the term "power density" and unless any confusion arises, the term "power" may also be interpreted as "total power".

In a conventional W-CDMA mobile communication system, the transmission power is controlled using a closed loop TPC (Transmitter Power Control) method (hereinafter may be simplified as "TPC"). In the TPC, a quality of a signal is measured at the receiver side, and the transmission power of the signal to be transmitted next time is adjusted so as to receive a predetermined quality of the signal by returning a transmission power control bit to the transmitter side. The transmission power control bit is transmitted via a return channel called DPCCH (Dedicated Physical Control CHannel).

In the system as shown in FIG. 1, the interference received by the base station (BS2) of a neighboring cell (Cell2) is estimated (determined) by summing the multiple signals output from the user equipment terminals UE1, UE2, and UE3. In the circuit-switched type communications, since a dedicated line is maintained for a relatively long period, the sum of the interference power from all the user equipment terminals is more likely to be rather equalized due to the statistical multiplexing effect. Therefore, it is expected that the transmission power can be stably controlled by using the closed loop TPC method.

Non Patent Document 1: 3GPP TS25.214

DISCLOSURE OF INVENTION

Problems to be Solved by the Invention

In the next-generation mobile communication systems such as an E-UTRA (Evolved Universal Terrestrial Radio Access) system and an LTE (Long Term Evolution) system, it is supposed that not the "circuit-switched" type communication system but a "packet-switched" type communication system is to be provided. In the mobile communication system such as the packet-switched type communication system, in each predetermined period (e.g., per each TTI (Transmission Time Interval) or per each subframe), one or more resource blocks (RB) each having a predetermined bandwidth are preferentially allocated to the user equipment having better channel quality. By doing this, the transmission efficiency is expected to be improved. A process of determining which radio resources are allocated to which user equipment is called scheduling. It does not always occur that the radio resources which are consecutive in time are allocated to the user equipment which is in communication with a base station. Rather, when a user equipment terminal transmits data using a time slot of a resource block, another resource block of the same frequency band may be used by another user equipment terminal. Further, for a user equipment terminal, it is not possible to expect (assume) that when resource blocks are allocated to the user equipment terminal, appropriate transmission signal power of the allocated resource blocks can be maintained at a relatively stable level. Rather, the transmission signal power may largely fluctuate as time elapses. Therefore, it may be difficult to directly apply the conventional closed loop TPC method to the next-generation mobile communication systems.

On the other hand, in order to ensure that the base station can measure the uplink channel quality, the reference signals (i.e., reference signals for CQI (Channel Quality Indicator) measurement) transmitted from the user equipment are required to be transmitted across quite a wide bandwidth. This is because the base station is required to determine which user equipment has better channel quality with respect to each of the resource blocks (RBs). In this case, it is to be noted that the power density and the maximum total transmission power of user equipment are relatively small compared with those of the base station. Therefore, the reference signal for CQI measurement should be transmitted across a wide bandwidth while the power density per unit bandwidth of the reference signal is controlled at a lower level. In the meantime, L1/L2 control signals and uplink data signals are transmitted only by specific resource blocks allocated as a result of scheduling. Therefore, the reference signals for decoding (i.e., for channel compensation) which are to be transmitted along with the L1/L2 control signals and the uplink data signals should have greater power density than the reference signals for CQI measurement upon being transmitted. However, unfortunately, sufficient research and development have not been implemented on the topic of the transmission power control in consideration of the differences between the types of the signals.

An object of the present invention is to control the transmission power of the uplink reference signal, control signal, and data signal at their appropriate levels.

Means for Solving the Problems

According to an aspect of the present invention, there is provided a base station apparatus to be used in a mobile communication system. The base station apparatus includes a unit to receive an uplink reference signal transmitted from user equipment at a predetermined cycle, a unit to provide transmission power control data indicating whether a transmission power value of the uplink reference signal to be transmitted later is changed based on a receiving quality of the uplink reference signal transmitted at a certain time point, a unit to derive a first offset power value so that the uplink control signal is transmitted at a transmission power value determined by adding the first offset power value to the transmission power value of the uplink reference signal, a unit to derive a second offset power value so that the uplink control signal is transmitted at a transmission power value determined by adding the second offset power value to the transmission power value of the uplink reference signal, and a unit to report the transmission power control data, the first offset power value, and the second offset power value to the user equipment. Further in the base station apparatus, the transmission power control data are transmitted to the user equipment at a cycle longer than the predetermined cycle.

Advantageous Effect Of The Invention

According to an embodiment of the present invention, it may become possible to control the transmission power of the uplink reference signal, control signal, and data signal at their appropriate levels.

BRIEF DESCRIPTION OF THE DRAWINGS

FIG. 10 is a sequence diagram showin an example of a transmission power control method of the data signal.

EXPLANATION OF REFERENCES

Figure 1:
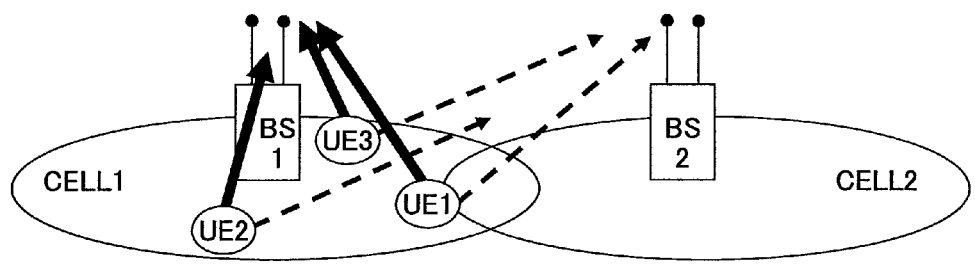
FIG. 1 is a schematic drawing of a mobile communication system.

21: REFERENCE SIGNAL GENERATION SECTION
22: L1/L2 CONTROL SIGNAL GENERATION SECTION
23: DATA SIGNAL GENERATION SECTION
24: POWER CONTROL SECTION
25, 26, 27: POWER SETTING SECTION
28: MULTIPLEXING SECTION
29: DETERMINATION SECTION
31: SEPARATION SECTION
32: CQI MEASUREMENT SECTION
33: TPC COMMAND GENERATION SECTION
34: L1/L2 CONTROL SIGNAL DEMODULATION SECTION
35: DATA SIGNAL DEMODULATION SECTION
36: OFFSET DETERMINATION SECTION
37: NEIGHBORING CELL INTERFERENCE MEASUREMENT SECTION
38: OVERLOAD INDICATOR GENERATION SECTION
39: MCS DETERMINATION SECTION

BEST MODE FOR CARRYING OUT THE INVENTION

According to an embodiment of the present invention, an uplink reference signal is transmitted at a cycle $T_{ref}$. The transmission power value of the uplink reference signal is updated at a cycle $T_{TPC}$, which is longer than the cycle $T_{ref}$, in accordance with the transmission power control information (hereinafter may be referred to as TPC information or a TPC command) reported from a base station apparatus so as to become equal to or greater than or equal to or less than the transmission power value of the uplink reference signal transmitted before. An uplink control signal is transmitted at the power value determined by adding a first offset power value $\Delta_{L1L2}$ reported from the base station apparatus to the transmission power value of the reference signal. An uplink data signal is transmitted at the power value determined by adding a second offset power value $\Delta_{data}$ reported from the base station apparatus to the transmission power value of the reference signal.

The transmission power value of the uplink reference signal is relatively frequently updated and expressed herein as $P_{ref}$. Both the transmission power value of the control signal and the transmission power value of the data signal are determined based on the transmission power value $P_{ref}$ of the uplink reference signal. By determining in this way, it may become possible to adequately determine the transmission power value of each of the signals.

The first offset power value $\Delta_{L1L2}$ (hereinafter may be simplified as first offset $\Delta_{L1L2}$) may be maintained without being changed or may be variably controlled. In the latter case, the first offset $\Delta_{L1L2}$ may be reported to the user equipment as broadcast channel (BCH) information or layer 3 signaling information.

The second offset power value $\Delta_{data}$ (hereinafter may be simplified as second offset $\Delta_{data}$) may be reported to the user equipment using an L1/L2 control signal.

Further, the first offset $\Delta_{L1L2}$ may be determined (increased or decreased) based on the amount of information included in the control signal.

Further, the first offset $\Delta_{L1L2}$ may be determined to be different from one another depending on a receiving quality of the control signal.

Further, the second offset $\Delta_{L1L2}$ may be determined to be different from one another depending on a receiving quality of the data signal.

Further, to respond to a request from a neighboring cell adjacent to the cell (serving cell) to which the user equipment belongs to reduce the transmission power of a signal from the user equipment, the transmission power of the uplink data signal from the user equipment may be reduced to a transmission power value which is less than the sum of the transmission power value $P_{ref}$ of the uplink reference signal and the second offset $\Delta_{data}$.

Although several preferred embodiments are separately described in the present invention, such separation of the embodiment is not essential to the present invention, and one or more embodiments may be combined on an as-needed basis.

Figure 2:
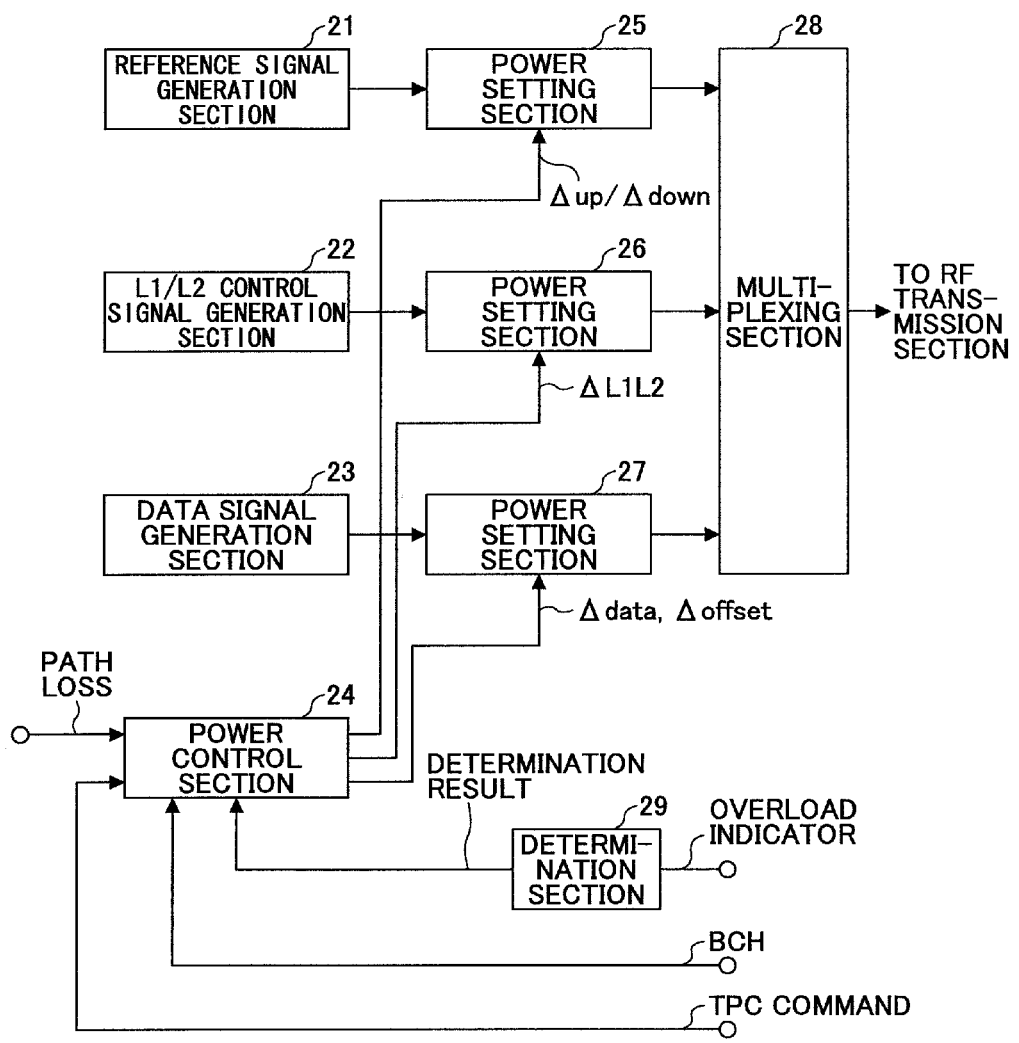
FIG. 2 is a partial block diagram of user equipment according to an embodiment of the present invention.

Embodiment 1
User Equipment
FIG. 2 is a partial block diagram of user equipment according to an embodiment of the present invention. The user equipment is typically used in a mobile communication system in which a single carrier method is used for the uplink transmission and an OFDM (Orthogonal Frequency Division Multiplexing) method is used for downlink transmission but may be used in any other system. As shown in FIG. 2, the user equipment includes a reference signal generation section 21, an L1/L2 control signal generation section 22, a data signal generation section 23, a power control section 24, power setting sections 25, 26, and 27, a multiplexing section 28, and a determination section 29.

The reference signal generation section 21 provides (generates) a reference signal to be transmitted in the uplink direction (i.e., from user equipment to the base station). The reference signal is a signal known by both of the transmitter side and the receiver side and may be referred to as a pilot signal, a training signal, a known signal and the like. The reference signal is classified into two types: one is a reference signal for CQI measurement to be transmitted across a wide bandwidth using multiple resource blocks, and the other is a reference signal for channel estimation to be transmitted only by using actually allocated specific resource blocks. Generally, the power density per unit bandwidth of the reference signal for CQI measurement is adjusted so as to be less than that of the reference signal for the channel estimation.

The L1/L2 control signal generation section 22 provides (generates) an L1/L2 control signal (a lower-layer control signal) to be transmitted in the uplink direction. The L1/L2 control signal may include the control information to be attached to the data signal or may include the control information that does not need to be attached to the data signal. In the former case, the control information may include transmission format information (information specifying such as the modulation method and data size) used for the uplink data signal. In the latter case, the control information may include a channel quality indicator (CQI) value derived by the user equipment based on the receiving quality of a downlink reference signal, transmission acknowledge information (ACK/NACK) indicating whether a downlink data signal received before is successfully received and the like.

The data signal generation section 23 provides (generates) a data signal (traffic data) to be transmitted in the uplink direction by the user of the user equipment. The information indicating which resource blocks are used for the transmission of the data signal is designated in the scheduling information reported from the base station.

The power control section 24 controls the power and the power density of the reference signal, the L1/L2 control signal, and the data signal in the manner described below. The power and the power density of each signal are set by the corresponding power setting sections 25, 26, and 27. Generally, the reference signal is repeatedly transmitted at a predetermined cycle $T_{ref}$, and the transmission power value of the reference signal transmitted next time is increased or decreased by a predetermined value or maintained without being changed compared with the transmission power value of the reference signal in the previous time based on, the transmission power control information (the TPC command) reported from the base station. The transmission power value of the L1/L2 control signal is set in a manner so that the L1/L2 control signal is transmitted at the power value determined by adding the transmission power value $P_{ref}$ of the uplink reference signal to the first offset $\Delta_{L1L2}$ (i.e. $P_{ref}+\Delta_{L1L2}$). The transmission power value of the data signal is set in a manner so that the data signal is transmitted at a power value determined by adding the transmission power value $P_{ref}$ of the uplink reference signal to the second offset $\Delta_{data}$ (i.e., $P_{ref}+\Delta_{data}$) or at a power value of ($P_{ref}+\Delta_{data}+\Delta_{offset}$) which is less than the sum of the above transmission power value $P_{ref}$ and the second offset $\Delta_{data}$ ($P_{ref}+\Delta_{data}$). Basically, the value of $\Delta_{offset}$ is determined or updated so as to be a negative offset value as described in detail below. When the information indicating the offset value $\Delta_{offset}$ is required to be reported to the base station, the information is fed to the L1/L2 control signal generation section 22 or the data signal generation section 23, so that the information indicating the offset value $\Delta_{offset}$ is transmitted to the base station by using an adequate transmission signal.

The multiplexing section 28 multiplexes the transmission power of the reference signal, the L1/L2 control signal, and the data signal whose power density have been adjusted by the power setting sections 25, 26, and 27, respectively.

The determination section 29 determines, when a request from a neighboring cell adjacent to the serving cell or a non-neighboring cell to reduce the uplink transmission power value of a signal from the user equipment, whether the uplink transmission power is reduced to respond to the request. Whether the request is received is determined depending on a signal called an overload indicator being received from the neighboring cell or the non-neighboring cell. The user terminal may always respond to the request as described in a second embodiment below or respond only under certain conditions.

Base Station

Figure 3:
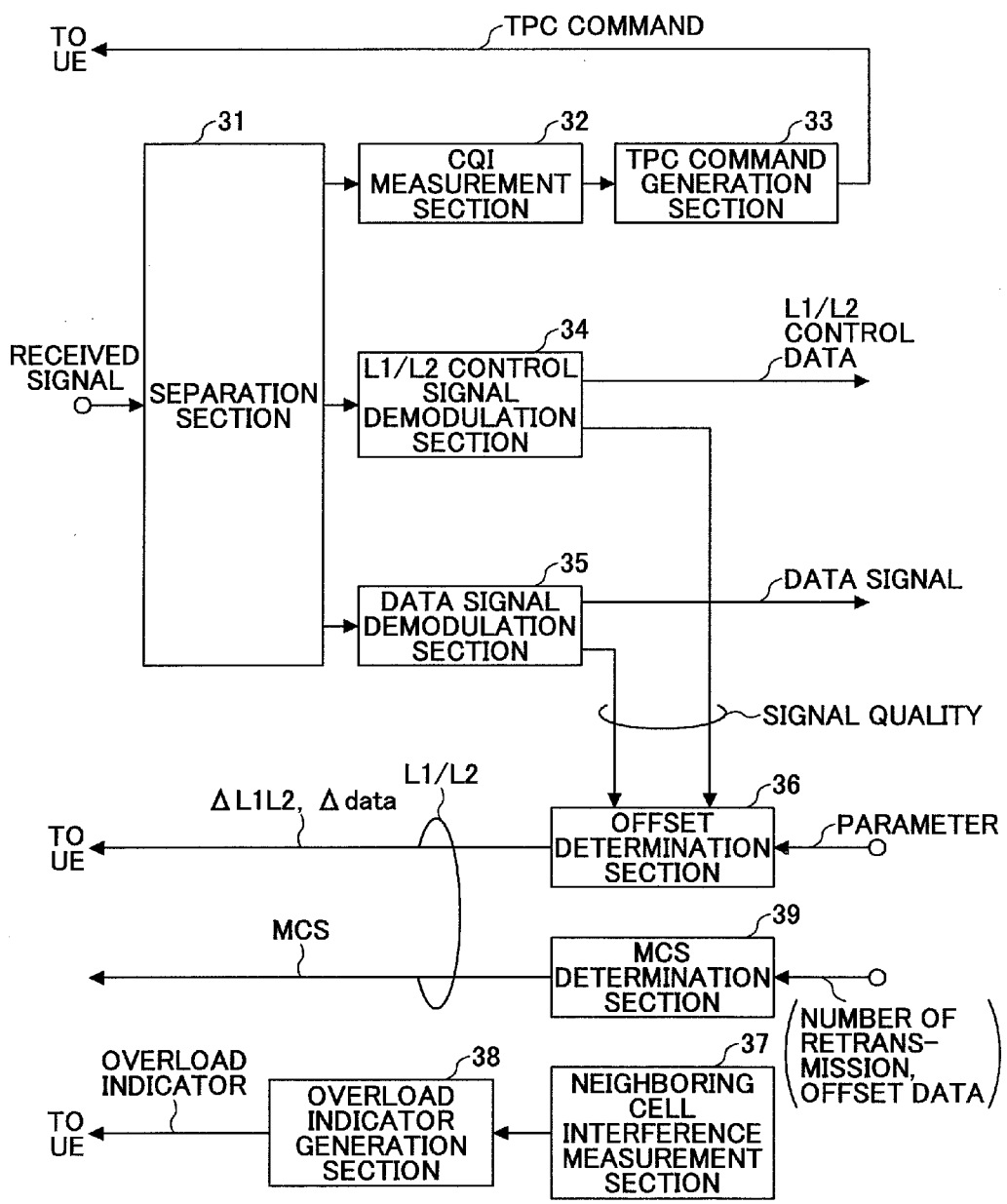
FIG. 3 is a partial block diagram of a base station apparatus according to an embodiment of the present invention.

FIG. 3 is a partial block diagram of a base station according to an embodiment of the present invention. The base station is typically used in a mobile communication system in which a single carrier method is used for the uplink transmission and an OFDM (Orthogonal Frequency Division Multiplexing) method is used for downlink transmission but may be used in any other system. As shown in FIG. 3, the base station includes a separation section 31, a CQI measurement section 32, a TPC command generation section 33, an L1/L2 control signal demodulation section 34, a data signal demodulation section 35, an offset determination section 36, a neighboring cell interference measurement section 37, an overload indicator generation section 38, and an MCS (Modulation and Coding Scheme) determination section 39.

The separation section 31 extracts the reference signal, the L1/L2 control signal, and the data signal from a received signal.

The CQI measurement section 32 measures the channel quality indicator (CQI) value indicating the uplink channel quality based on the receiving quality of the uplink reference signal. This uplink reference signal refers to the reference signal for CQI measurement transmitted across a wide bandwidth using multiple resource blocks. In this embodiment of the present invention, it is assumed that such a reference signal is repeatedly transmitted at the predetermined cycle $T_{ref}$ (such as every several ms or every tens of ms) so that the base station can receive the reference signal regularly.

The TPC command generation section 33 generates a TPC (Transmission Power Control) command based on the measured CQI value. The generated TPC command indicates whether the transmission power value of the reference signal to be transmitted next time from the user equipment is to be increased or decreased by a predetermined value from the current value, or maintained without being changed. However, from the viewpoint of reducing the number of bits expressing the TPC command, the number of choices may be reduced (limited) to two so that the generated TPC command indicates only whether the transmission power value of the reference signal to be transmitted next time from the user equipment is to be increased or decreased by a predetermined value from the current value.

The L1/L2 control signal demodulation section 34 demodulates and extracts the L1/L2 control signal. In this embodiment of the present invention, the L1/L2 control signal demodulation section 34 reports the receiving quality of the received L1/L2 control signal to the offset determination section 36.

The data signal demodulation section 35 demodulates and outputs the data signal. In this embodiment of the present invention, the data signal demodulation section 35 reports the receiving quality of the received data signal to the offset determination section 36.

The offset determination section 36 determines the first offset power value $\Delta_{L1L2}$ and the second offset power value $\Delta_{data}$ based on at least one of the receiving quality of the L1/L2 control signal, the receiving quality of the data signal, and another parameter value. The first offset power value $\Delta_{L1L2}$ indicates to what extent the transmission power value of the uplink L1/L2 control signal is set to be higher than the transmission power value of the reference signal. In other words, the base station sends an instruction to the user equipment so that the transmission power value of the uplink L1/L2 control signal is set according to the following formula:

$$P_{L1L2} = P_{ref} + \Delta_{L1L2}$$

The second offset power value $\alpha_{data}$ indicates to what extent the transmission power value of the uplink data signal is to be set higher than the transmission power value of the reference signal. In other words, the base station sends an instruction to the user equipment so that the transmission power of the uplink data signal is set according to the following formula:

$$P_{data} = P_{ref} + \Delta_{data}$$

As described in the second embodiment of the present invention below, when the user equipment determines to respond to the request from a neighboring cell to reduce the transmission power value of the uplink data signal from the user equipment, the transmission power value of the uplink data signal may be reduced to a power value expressed by the following formula:

$$P_{data} = P_{ref} + \Delta_{data} + \Delta_{offset}$$

wherein, basically, the value of the symbol $\Delta_{offset}$ is a negative value.

The other parameter value to be used to determine the first offset $\Delta_{L1L2}$ and the second offset $\Delta_{data}$ may be, for example, the number of bits indicating the L1/L2 control signal. When the information content of the L1/L2 control signal indicates such as transmission acknowledge information (ACK/NACK), practically only one bit is enough to indicates the information content. In this case, the transmission power required to transmit the one bit is relatively low. On the other hand, in such a case where the information content is like the CQI value which requires many bits, the more bits required to represent the information content, the more total transmission power is required to transmit the information content. Therefore, the first offset $\Delta_{L1L2}$ may be determined by considering the information content to be transmitted. Further, the other parameter may be the upper limit value of the transmission power of the user equipment. This is because when the transmission power reaches the upper limit value, it may be meaningless to transmit an instruction to increase the transmission power value to the user equipment.

The neighboring cell interference measurement section 37 measures an amount of neighboring-cell interference received from the user equipment in a neighboring cell. Herein, the neighboring cell refers to a cell adjacent to the serving cell to which the user equipment belongs and a cell located near the serving cell (non-neighboring cell).

The overload indicator generation section 38 generates, when the amount of neighboring-cell interference exceeds a predetermined amount (a threshold value), a signal (overload indicator) to request to the user equipment in the neighboring cell to reduce the transmission power value of an uplink signal from the user equipment.

The MCS determination section 39 determines an MCS number to be used for a data signal transmitted to or from the user equipment. The MCS number refers to a number to specify a predetermined combination of a data modulation method and a channel coding rate and may be determined so that the MCS number increases as an achievable bit rate of the communications increases. The MCS number may be reported to the user equipment along with the first offset $\Delta_{L1L2}$ and the second offset $\Delta_{data}$ or using the L1/L2 control signal separately from the first offset $\Delta_{L1L2}$ and the second offset $\Delta_{data}$. Basically, the MCS number is determined based on factors such as the channel quality, a predetermined quality level required by the user equipment, and the scheduling information. However, in this embodiment of the present invention, the MCS number may be adjusted (determined) based on the number of retransmissions of packet data, a third offset $\Delta_{offset}$ described below and the like. In this case, for example, when determining that the number of retransmissions or the third offset power value $\Delta_{offset}$ becomes greater than the corresponding predetermined value, the MCS number for the user equipment may be reduced. As a result of decreasing the MCS number, the instantaneous throughput of the data transmission may be temporarily reduced, but, it may make it easier to satisfy the predetermined quality level required by the user equipment and reduce the number of retransmission. As a result, it may become possible to increase the overall throughput of the data transmission.

In the following, the transmission power control methods for the reference signal, the L1/L2 control signal, and the data signal are separately described.

Transmission Power Control of Reference Signal

Figure 4:
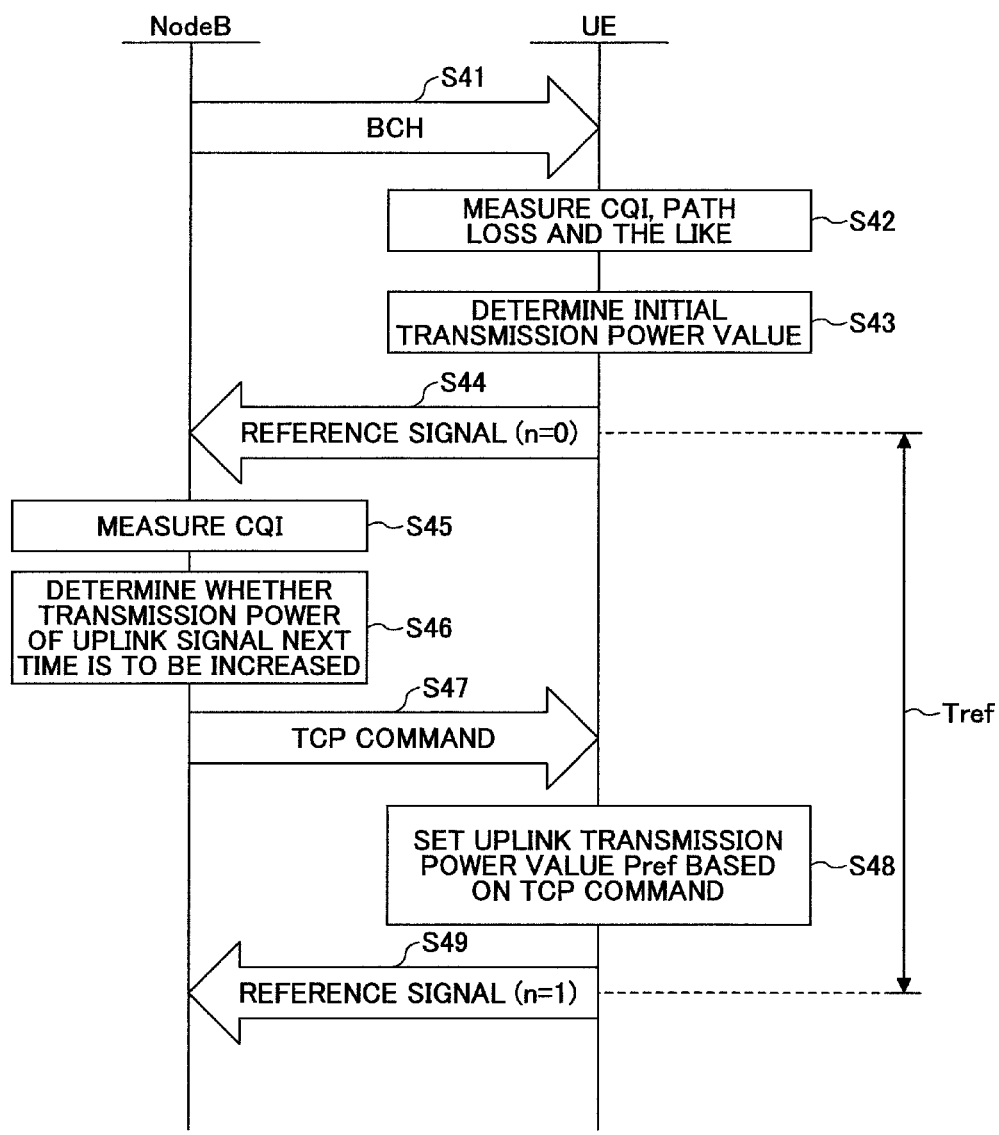
FIG. 4 is a sequence diagram showing a transmission power control method of a reference signal.

FIG. 4 is a sequence diagram showing a transmission power control method of a reference signal according to an embodiment of the present invention. In step S41, the base station (NodeB) reports broadcast channel (BCH) information to the user equipment (UE) which is under the control of the base station (NodeB). The broadcast channel (BCH) information includes various information items of all the user equipment in the cell of the base station and may further include the information identifying cells (cell ID), a transmission power value of a downlink reference signal, a target quality value, an uplink interference power density value and the like. As an example, the target quality value may be expressed by the received signal energy per symbol to noise (plus interference) power density ratio ($E_s/I_0$). The broadcast channel (BCH) information may further includes a parameter of the overload indicator, a parameters ($\Delta_{down}$, $\Delta_{up}$) used for updating the third offset $\Delta_{offset}$ described below and the like. The parameter of the overload indicator may include a predetermined time period within which the overload indicator may be received by the user equipment since a previous uplink data signal has been transmitted.

In step S42, the user equipment measures the CQI value indicating the downlink channel quality based on the receiving quality of the downlink reference signal, a path loss L and the like. The path loss L is derived from the difference between a transmission power value and a receiving power value and is obtained as an average value by receiving the downlink reference signal for a certain period of time. Further, the path loss L is mainly determined by the distance fluctuation and the shadowing and has a characteristic that average path loss in the uplink direction does not greatly differ from that in the downlink direction. Further, the path loss L does not depend on the instantaneous fading. Generally, the path loss L satisfies the following formula:

$$SIR_t = P_{TX} + L - I_0$$

where the symbol $SIR_t$ denotes the target quality, the symbol $P_{TX}$ denotes the transmission power value, and the symbol $I_0$ denotes the interference power value.

In step S43, based on the relationship in the above formula, the user equipment determines an initial transmission power of the uplink reference signal. As shown in FIG. 4, no uplink reference signal has been transmitted before step S43; therefore, an initial transmission power value $P_{ref}(n=0)$ is determined in step S43.

In step S44, the user equipment transmits the uplink reference signal at the power value determined in step S43. As described above, this uplink reference signal is the signal for CQI measurement and is transmitted across a wide bandwidth including multiple resource blocks.

In step S45, the base station receives the uplink reference signal and measures the receiving quality (such as CQI) value of the received uplink reference signal. As an example, the base station measures a received SINR (Signal-to-Interference plus Noise power Ratio) and derives the CQI value as a range where the received SINR falls in.

In step S46, based on the measured receiving quality, the base station determines whether the transmission power value of the uplink reference signal to be transmitted next time is increased. When determining that the measured receiving quality is not so good, the transmission power value of the uplink reference signal to be transmitted next time is increased. On the other hand, when determining that the measured received signal quality is excessively good, the transmission power value of the uplink reference signal to be transmitted next time is decreased. Further, when determining that the measured receiving quality is adequate, the transmission power value of the uplink reference signal to be transmitted next time is maintained without being changed; this option, however, may be removed from the viewpoint of reducing the information amount (i.e., the number of bits) of the TPC command. In step S47, the base station issues the TPC command to report the result of the determination made in step S46 to the user equipment.

In step S48, based on the reported information content expressed by the issued TPC command in step S47, the user equipment determines and sets the transmission power value ($P_{ref}(n=1)$) of the uplink reference signal to be transmitted next time.

$$P_{ref}(n=1) = P_{ref}(n=0) \pm \Delta \text{ or } P_{ref}(n=0)$$

where the symbol $\Delta$ denotes a relatively small value fixed in the system.

In step S49, the user equipment transmits the uplink reference signal at the determined transmission power value ($P_{ref}(n=1)$).

After that, the uplink reference signal is repeatedly transmitted at the determined cycle $T_{ref}$ (such as several tens of milliseconds). Further, at the determined cycle $T_{TPC}$, steps S46 and S47 are repeatedly performed and the TPC command is transmitted to the user equipment at the same cycle $T_{TPC}$. The transmission cycle $T_{ref}$ of the uplink reference signal may be the same as or shorter than the transmission cycle $T_{TPC}$ of the TPC command (in the latter case, $T_{ref} < T_{TPC}$). In any case, the transmission power value of the uplink reference signal is reviewed and may be changed by the predetermined value $\Delta$ or maintained without being changed. By doing this way, it may become possible to expect that the transmission power value of the uplink reference signal tends to follow an adequate value within a range not exceeding the maximum value of the transmission power.

As is described below, the transmission power value of the uplink reference signal is used when the transmission power value of the uplink control signal and the transmission power value of the data signal are determined. The uplink control signal and the data signal are scheduled in each subframe. Therefore, the cycle of the transmission of the uplink reference signal and the TPC command may be set longer than the subframe. The time length of the subframe and the transmission time interval (TTI) are typically one ms. Further, from the viewpoint of stabilizing the performance by updating the transmission power of the uplink reference signal little by little but frequently, it is preferable that the predetermined value $\Delta$ and the predetermined cycle $T_{TPC}(\geq T_{ref})$ be smaller values.

Transmission Power Control of L1/L2 Control Signal

Figure 5:
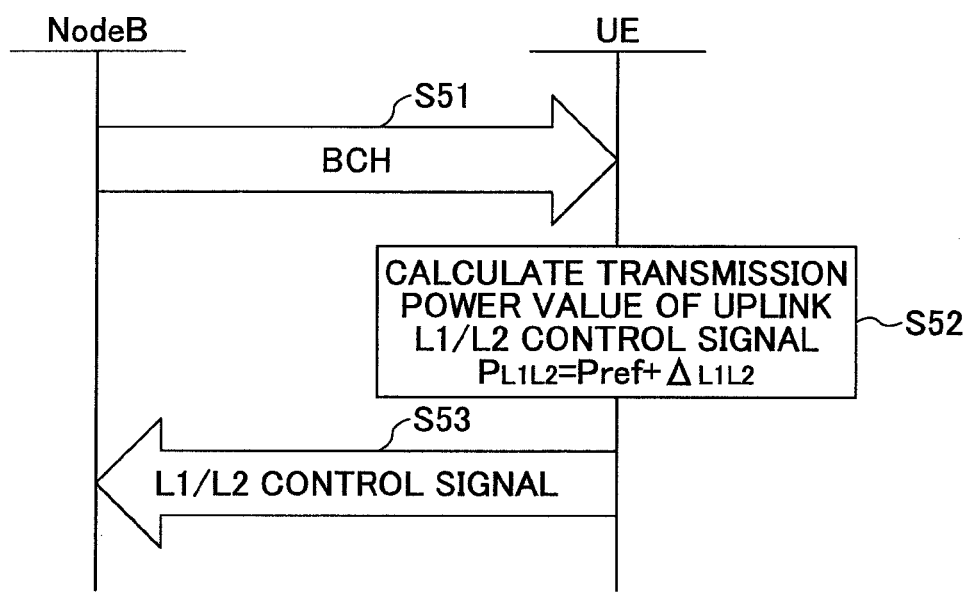
FIG. 5 is a sequence diagram showing a transmission power control method of an L1/L2 control signal.

FIG. 5 is a sequence diagram showing a transmission power control method of the L1/L2 control signal according to an embodiment of the present invention. Similar to the case of the transmission power control of the reference signal described above, in step S51, the base station (NodeB) reports broadcast channel (BCH) information to the user equipment (UE).

The broadcast channel (BCH) information includes the offset value (i.e., the first offset power value) $\Delta_{L1L2}$ to be used for the transmission power control of the L1/L2 control signal.

In step S52, the user terminal determines and sets the transmission power value of the uplink L1/L2 control signal according to the following formula:

$$P_{L1L2} = P_{ref} + \Delta_{L1L2}$$

where the symbol $P_{L1L2}$ denotes the transmission power value of the L1/L2 control signal to be transmitted next time and the symbol $P_{ref}$ denotes the latest transmission power value of the uplink reference signal.

In step S53, the user equipment transmits the L1/L2 control signal at the power value of $P_{L1L2}$ determined in step S52.

In this case, the first offset $\Delta_{L1L2}$ may be determined based on the information content included in the L1/L2 control signal to be transmitted or the receiving quality of the uplink L1/L2 control signal received before.

Figure 6:
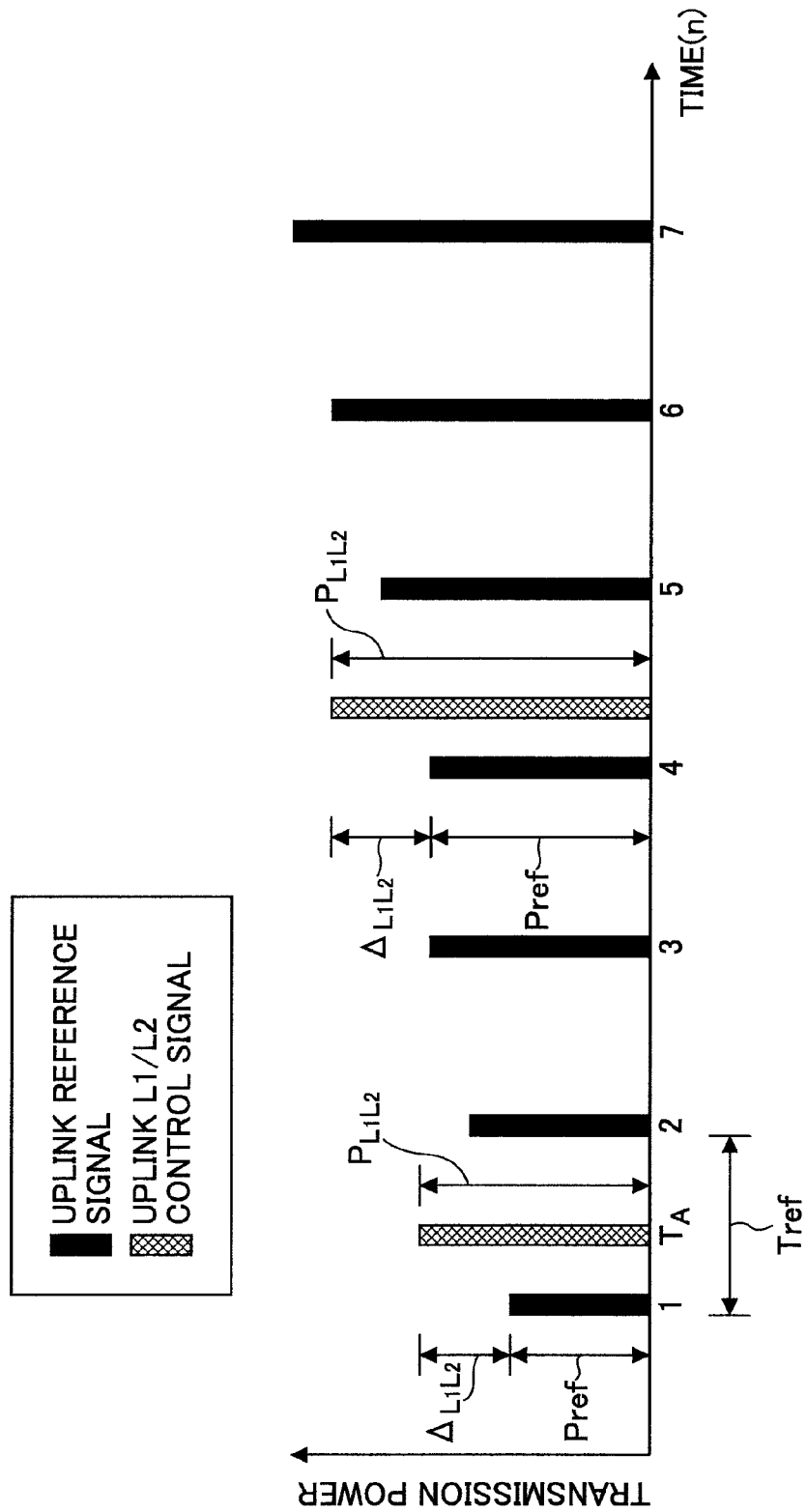
FIG. 6 is a graph showing a relationship between the transmission power of the reference signal and the transmission power of the L1/L2 control signal.

FIG. 6 schematically shows the change of the transmission power value of the uplink reference signal and the transmission power value of the uplink L1/L2 control signal. As shown in FIG. 6, the uplink reference signal is repeatedly transmitted at the predetermined cycle $T_{ref}$. In the example of FIG. 6, the TPC command is also repeatedly issued at the same frequency (cycle), resulting in the transmission power value $P_{ref}$ being updated at the cycle $T_{ref}$. As shown in FIG. 6, the uplink L1/L2 control signal is assumed to be transmitted at the timing $T_A$. In this case, the transmission power value $P_{L1L2}$ of the uplink L1/L2 control signal is determined according to the following formula:

$$P_{L1L2} = P_{ref}(n=1) + \Delta_{L1L2}$$

Further, the uplink L1/L2 control signal is assumed to be transmitted at the timing $T_B$ as well. In this case, the transmission power $P_{L1L2}$ of the uplink L1/L2 control signal is determined as in the following formula:

$$P_{L1L2} = P_{ref}(n=4) + \Delta_{L1L2}$$

As shown in this formula, the uplink L1/L2 control signal is transmitted at the power value of $P_{L1L2}$ determined by adding the predetermined offset value to the latest transmission power value of the uplink reference signal.

In this embodiment of the present invention, the first offset $\Delta_{L1L2}$ is reported to the user equipment using the broadcast channel (BCH) information as shown in step S51 of FIG. 5. However, the first offset $\Delta_{L1L2}$ may be reported as layer 3 information or maintained as a fixed value without being reported each time.

Transmission Power Control of the Data Signal

Figure 7:
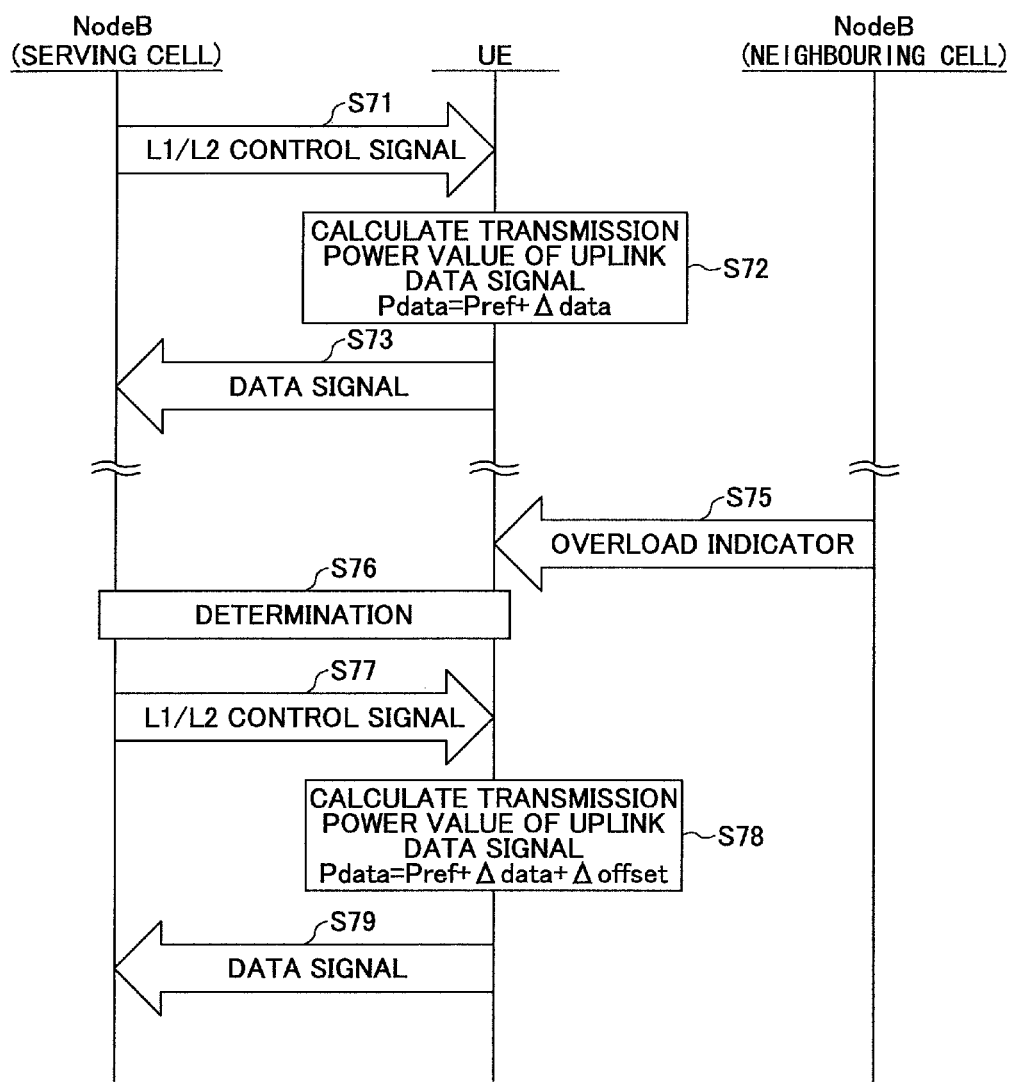
FIG. 7 is a sequence diagram showing a transmission power control method of a data signal.

FIG. 7 is a sequence diagram showing a transmission control method of the data signal according to an embodiment of the present invention. In step S71, the base station (NodeB) transmits the downlink L1/L2 control signal to the user equipment (UE). The downlink L1/L2 control signal includes the scheduling information indicating which radio resources are allocated to the target user equipment (UE). In this embodiment of the present invention, the downlink L1/L2 control signal further includes the second offset $\Delta_{data}$ as a part of the scheduling information or the information other than the part of the scheduling information.

In step S72, the user equipment determines and sets the transmission power value of the uplink data signal according to the following formula:

$$P_{data} = P_{ref} + \Delta_{data}$$

where the symbol $P_{data}$ denotes the transmission power value of the data signal to be transmitted next and the symbol $P_{ref}$ denotes the latest transmission power value of the uplink reference signal.

In step S73, the user equipment transmits the uplink data signal at the power value of $P_{data}$ determined in step S72.

In this first embodiment of the present invention, the uplink data signal is transmitted at the power value determined by adding the predetermined offset value to the transmission power value of the latest uplink reference signal. The second offset $\Delta_{data}$ is reported to the user equipment on an as-needed basis using the downlink L1/L2 control signal. The second offset $\Delta_{data}$ may be determined based on the receiving quality of the data signal received before.

Further, the user equipment may report a power headroom value to the base station periodically or non-periodically (i.e., on an as-needed basis). The power headroom value refers to an amount indicating to what extent the current transmission power can be increased (i.e., power margin) and varies depending on the path loss value. Therefore, the base station is required to determine the transmission power value of the user equipment (more specifically second offset $\Delta_{data}$) by considering the power headroom value.

Figure 8:
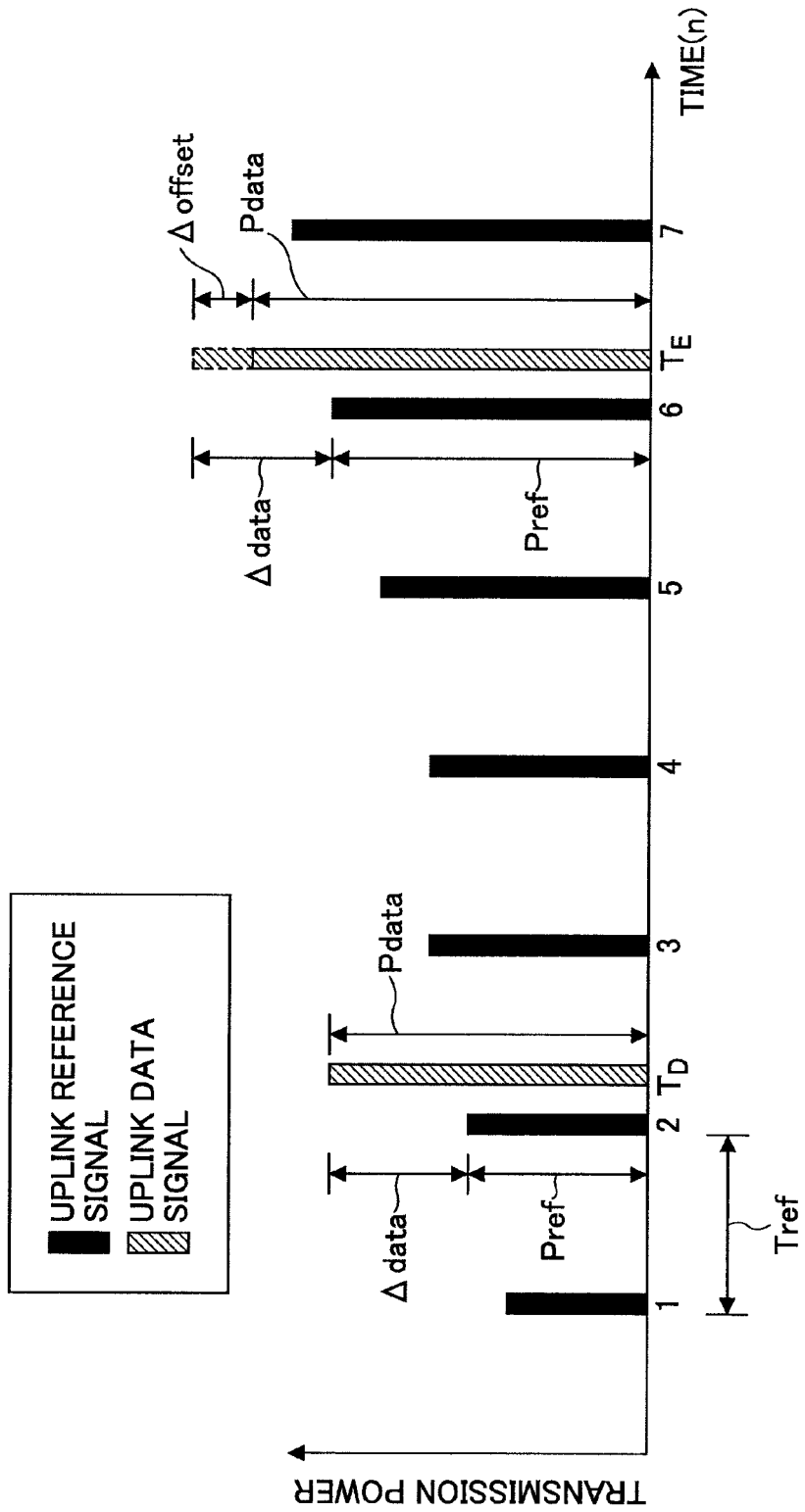
FIG. 8 is a graph showing a relationship between the transmission power of the reference signal and the transmission power of the data signal.

FIG. 8 schematically shows the change of the transmission power value of the uplink reference signal and the transmission power value of the uplink data signal. As shown in FIG. 8, the uplink reference signal is repeatedly transmitted at the predetermined cycle $T_{ref}$. In the example of FIG. 8, the TPC command is also repeatedly issued at the same frequency (cycle), resulting in the transmission power $P_{ref}$ being updated at the cycle $T_{ref}$. As shown in FIG. 8, the data signal is assumed to be transmitted at the timing $T_D$. In this case, the transmission power value $P_{data}$ of the data signal is determined according to the following formula:

$$P_{data} = P_{ref}(n=2) + \Delta_{data}$$

As shown in this formula, the data signal is transmitted at the power value of $P_{data}$ determined by adding the predetermined offset value to the latest transmission power value of the uplink reference signal.

Embodiment 2

As referred in the above description of the determination section 29, the user equipment may always respond to the request from a neighboring cell adjacent to the serving cell or a non-neighboring cell to reduce the transmission power value of an uplink signal from the user equipment or respond to the request only under certain conditions. Whether the user equipment responds to the request may be determined by the user equipment alone or the base station having the serving cell to which the user equipment belongs. In any case, the determination section 29 determines whether the user equipment receives the request from the neighboring cell. The determination section 29 determines whether the request is received by determining whether a signal called the overload indicator is received from a neighboring cell.

It is conceived that there may be cases where it may be better for the user equipment to respond to the request and cases where it may be better for the user equipment not to respond to the request.

(1) For example, in a case where a path loss value $L_s$ in the serving cell measured by the serving cell is greater than a predetermined threshold value, the transmission power value of a signal from the user equipment is required to be increased by just so much, which may result in the interference to the neighboring cell being increased. When such user equipment receives the overload indicator (request) from the neighboring cell, it may be better for the user equipment to respond to request to reduce the transmission power value of the signal. On the other hand, in a case where the path loss value $L_s$ in the serving cell measured by the serving cell is not greater than a predetermined threshold value, it is not necessary to transmit a signal using relatively higher transmission power, which may result in the interference to the neighboring cell being relatively small. When such user equipment receives the overload indicator (request) from the neighboring cell, it may be better for the user equipment not to respond to the request to reduce the transmission power value of the signal. As described above, whether the user equipment should respond to the request using the overload indicator from the neighboring cell may be determined by comparing the path loss value $L_s$ in the serving cell with the predetermined threshold value.

(2) Otherwise, not only the path loss value $L_s$ in the serving cell but also a path loss value $L_{NS}$ in the neighboring cell may be considered. In a case where the path loss value $L_{NS}$ in the neighboring cell is relatively large, when the user equipment transmits a signal, the signal may be greatly attenuated before arriving at the base station of the neighboring cell. Therefore, the interference to the neighboring cell may be relatively small. On the other hand, in a case where the path loss value $L_{NS}$ in the neighboring cell is relatively small, when the user equipment transmits a signal, the signal may be transmitted to the base station of the neighboring cell without being attenuated so much. Therefore, the interference to the neighboring cell may be considerably large. Further, in a case where the path loss value $L_s$ in the serving cell and the path loss value $L_{NS}$ in the neighboring cell are at similar levels, when the user equipment transmits a signal to the base station of the serving cell, the signal may be transmitted to the base station of the neighboring cell at the same level as that of the base station of the serving cell. Therefore the signal may become a strong interference source to the base station of the neighboring cell. Therefore, when the path loss value $L_{NS}$ in the neighboring cell is relatively small and the path loss value $L_s$ in the serving cell is relatively large and when the path loss value $L_s$ in the serving cell and the path loss value $L_{NS}$ in the neighboring cell are at similar levels, it may be better for the user equipment to respond to the request to reduce the transmission power value of the signal from the user equipment. Otherwise, it may not necessary for the user equipment to respond to the request to reduce the transmission power value of the signal from the user equipment. This condition may be described in another way: i.e., when a difference value of the path losses ($L_{NS}-L_S$) is nearly zero (0) or a negative value, it may be better for the user equipment to respond to the request (overload indicator), otherwise it is not necessary for the user equipment to respond to the request.

In accordance with the criteria such as (1) or (2) described above, when the user equipment determines to respond to the request from the neighboring cell to reduce the transmission power, the power control section 24 shown in FIG. 2 reduces the transmission power value of the uplink data signal to some extent.

$$P_{data}=P_{ref}+\Delta_{data}+\Delta_{offset}$$

where the symbol $\Delta_{offset}$ denotes a third offset power value (hereinafter may be simplified as third offset) having, basically, a negative value. The third offset $\Delta_{offset}$ may be a fixed value in the system or may be adequately updated (changed) as described in a third embodiment of the present invention described below.

Referring back to FIG. 7, in step S75, the user equipment (UE) receives the overload indicator from a neighboring cell.

In step S76, upon receiving the overload indicator, the user equipment determines whether the user equipment responds to the request (overload indicator) to reduce the transmission power. As described above, this decision may be made by the base station alone or by the user equipment independently.

In step S77, the base station (NodeB) of the serving cell transmits the downlink L1/L2 control signal to the user equipment (UE). This downlink L1/L2 control signal includes the scheduling information indicating which radio resources are allocated to the target user equipment (UE). Further, the downlink L1/L2 control signal further includes the second offset $\Delta_{data}$ as a part of the scheduling information or the information as other than the part of the scheduling information.

In step S78, the user equipment determines and sets the transmission power value of the uplink data signal according to the following formula:

$$P_{data}=P_{ref}+\Delta_{data}+\Delta_{offset}$$

where the symbol $P_{ref}$ denotes the latest transmission power value of the uplink reference signal.

In step S79, the user equipment (UE) transmits the uplink data signal at the power value of $P_{data}$ determined in step S78 to the base station (NodeB).

Referring to FIG. 8 again, the uplink data signal is assumed to be transmitted at the timing $T_E$.

In this case, the user equipment (UE) has already received the overload indicator from the neighboring cell in step S75. The transmission power $P_{data}$ of the data signal is determined according to the following formula:

$$P_{data}=P_{ref}(n=6)+\Delta_{data}+\Delta_{offset}$$

As described above, in this second embodiment of the present invention, the uplink data signal is transmitted at the power value which is lower than the power value determined by adding the predetermined offset value (the second offset $\Delta_{data}$) to the latest transmission power value of the uplink reference signal. After that, when, for example, a predetermined time period has elapsed without receiving any overload indicator, reducing the transmission power by the third offset $\Delta_{offset}$ may be stopped or may not be stopped. The reason of this is as follows. When a communication environment changes as time elapses, the transmission power value $P_{ref}$ of the uplink reference signal is accordingly updated and the second offset $\Delta_{data}$ is also updated in accordance with the receiving quality of the uplink data signal. Therefore, it may become possible to expect that the value of "$P_{ref}+\Delta_{data}$" approaches an adequate value as time elapses without additionally considering the third offset $\Delta_{offset}$. However, from the viewpoint of more aggressively controlling the transmission power value, a method in a third embodiment of the present invention described below may be used.

Embodiment 3

Figure 9:
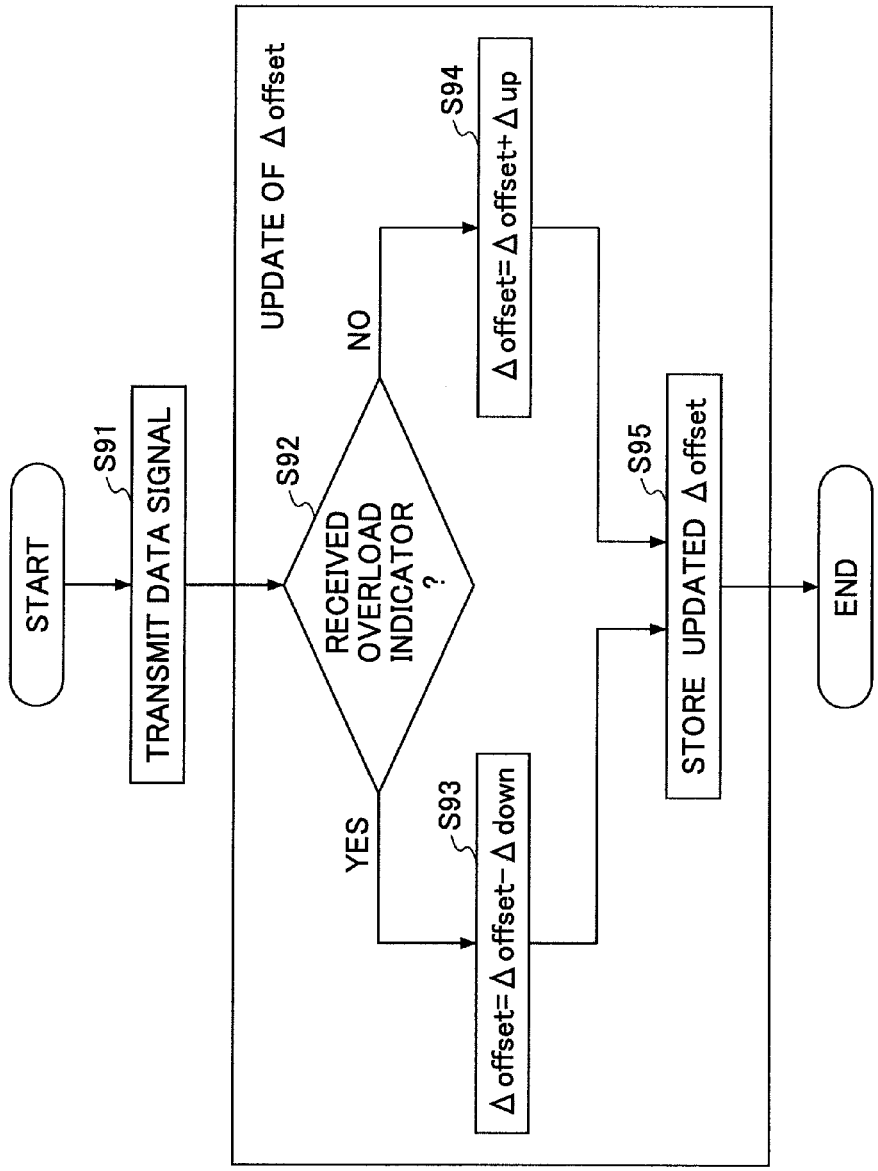
FIG. 9 is a flowchart showing a process of updating an offset power level used in the transmission power control of the data signal.

FIG. 9 is a flowchart showing a process of updating the third offset $\Delta_{offset}$ used for transmission power control of the data signal. This process in the flowchart is performed in the user equipment (UE).

In step S91, after obtaining the permission from the base station (based on the uplink scheduling information included in the downlink L1/L2 control signal), the user equipment transmits the uplink data signal to the base station (NodeB). This step may be equivalent to the steps S73 and S79 in FIG. 7. For explanation purposes, the initial transmission power of the uplink data signal is given as $P_{ref}+\Delta_{data}$ (i.e., $\Delta_{offset}=0$).

In step S92, the user equipment determines whether the user equipment receives the overload indication from a neighboring cell. In this embodiment of the present invention, it is assumed that when an amount of neighboring-cell interference exceeding a predetermined permitted value is observed in a cell, the cell reports (transmits) the overload indicator to its neighboring cells (surrounding cells) within a predetermined time period. Therefore, when the user equipment transmits an uplink signal and the amount of neighboring-cell interference caused by the transmission of the uplink signal exceeds the predetermined permitted value in a neighboring cell, the overload indicator is transmitted from the neighboring cell to the user equipment. Otherwise, no overload indicator is transmitted to the user equipment. When the user equipment determines that the user equipment receives the overload indicator, the process goes to step S93, and otherwise, the process goes to step S94.

In step S93, the reception of the overload indicator leads to reducing the third offset $\Delta_{offset}$ ($\Delta_{offset}=\Delta_{offset}-\Delta_{down}$). The value of $\Delta_{down}$ (>0) may be adequately adjusted. In a case where the process goes to step S93, in order to respond to the request to reduce the transmission power from the neighboring cell, the transmission power value of the uplink signal to be transmitted next time is determined to be less than the value $P_{ref}+\Delta_{data}$ due to the consideration of the value of the third offset $\Delta_{offset}$.

On the other hand, in step S94, due to the fact that no overload indicator is received, the third offset $\Delta_{offset}$ increases ($\Delta_{offset}=\Delta_{offset}+\Delta_{up}$). The value of $\Delta_{up}$ (>0) may be adequately adjusted. In a case where the process goes to step S94, since no request to reduce the transmission power is received, the third offset $\Delta_{offset}$ to be added to the value $P_{ref}+\Delta_{data}$ next time is increased so that the third offset $\Delta_{offset}$ to be used for the next time is greater than the current third offset $\Delta_{offset}$. In step S95, the updated value of the third offset $\Delta_{offset}$ is stored in a memory and the process of updating the third offset $\Delta_{offset}$ ends. After that, whenever the data signal is transmitted, the described steps are performed so that the third offset $\Delta_{offset}$ is updated so that the third offset $\Delta_{offset}$ is increased or decreased.

The values (change amounts) of $\Delta_{down}$ and $\Delta_{up}$ to be used for updating the third offset $\Delta_{offset}$ may be adequately adjusted. Therefore, the value of $\Delta_{down}$ and the value of $\Delta_{up}$ may be the same as each other or different from each other. However, from the viewpoint of reducing the frequency of issuing the overload indicator, it is preferable that the value of $\Delta_{down}$ be greater than the value of $\Delta_{up}$ (i.e., $\Delta_{down} > \Delta_{up}$). This is because in a case where it is assumed that both $\Delta_{down}$ and $\Delta_{up}$ have the same value of one (1) unit power, when the overload indicator is received as a result of the initial (first) transmission of the first uplink data signal, the transmission power value of the second uplink data signal is reduced by $\Delta_{down}$ (=1 unit power), and therefore no overload indicator is received in the second transmission of the uplink data signal. In this case, when the above flowchart is applied, the transmission power of the third uplink data signal is increased by the $\Delta_{up}$ (=1 unit power). If this is the case, the transmission power value of the third uplink data signal approaches the transmission power of the first uplink data signal, which may cause the same result that the overload indicator is received. Therefore, preferably, for example, those values be set so that $\Delta_{down}$=1 unit power and $\Delta_{up}$=0.5 unit power (i.e. $\Delta_{down} > \Delta_{up}$). By setting the value of $\Delta_{down}$ to be greater than the value of $\Delta_{up}$ ($\Delta_{down} > \Delta_{up}$), it becomes possible to reduce the frequency of receiving the overload indicator and increase the transmission power as much as possible.

FIG. 10 is a sequence diagram showing an exemplary transmission power control method of a data signal according to an embodiment of the present invention. In this example, the transmission power is controlled while the third offset $\Delta_{offset}$ is updated as described with reference to FIG. 9.

In step S101, the base station (NodeB) of the serving cell transmits the downlink L1/L2 control signal to the user equipment (UE). This downlink L1/L2 control signal includes the scheduling information indicating which radio resources are allocated to the target user equipment (UE). Further, the downlink L1/L2 control signal further includes the second offset $\Delta_{data}$ as a part of the scheduling information or the information as other than the part of the scheduling information.

In step S102, the user equipment determines and sets the transmission power value of the uplink data signal according to the following formula:

$$P_{data} = P_{ref} + \Delta_{data} + \Delta_{offset}$$

where the symbol $P_{ref}$ denotes the latest transmission power value of the uplink reference signal. For explanation purposes, the third offset $\Delta_{offset}$ at this point is given as zero (0) ($\Delta_{offset}$=0).

In step S103, the user equipment transmits the uplink data signal at the power value of $P_{data}$ determined in step S102. The uplink data signal is transmitted to the base station of the serving cell and is received by the base station of a neighboring cell as interference power.

In step S104, since the interference power exceeds the predetermined permitted value, the base station (NodeB) of the neighboring cell transmits the overload indicator within a predetermined time period, and the transmitted overload indicator is received by the user equipment (UE) within the predetermined time period.

In step S105, the base station (NodeB) of the serving cell transmits the downlink L1/L2 control signal to the user equipment (UE) and as a result, the transmission of the uplink data signal based on the scheduling information included in the downlink L1/L2 control signal is permitted. Further, the second offset data is included in the downlink L1/L2 control signal as a part of the scheduling information or the information as other than the part of the scheduling information.

In step S106, the value of the third offset $\Delta_{offset}$ is updated, and based on the updated third offset $\Delta_{offset}$ the transmission power value of the uplink data signal is determined according to the following formula:

$$P_{data} = P_{ref} + \Delta_{data} + \Delta_{offset}$$

where the symbol $P_{ref}$ denotes the latest transmission power value of the uplink reference signal. In this case, since the user equipment (UE) has received the overload indicator in step S104, as described in steps S92 and S93 with reference to FIG. 9, the third offset $\Delta_{offset}$ is updated so as to be reduced by a unit power $\Delta_{down}$. For explanation purposes, it is assumed that the value of $\Delta_{down}$ is 1 unit power ($\Delta_{down}$=1 unit power). Therefore, in step S106, the value of third offset $\Delta_{offset}$ stored in the memory is −1 unit power (i.e., $\Delta_{offset}$=−1).

In step S107, the user equipment transmits the uplink data signal at the power value of $P_{data}$ determined in step S106. The uplink data signal is transmitted to the base station of the serving cell and is received by the base station of the neighboring cell as interference power. In this example, since the interference power still exceeds the predetermined permitted value, the base station (NodeB) of the neighboring cell transmits the overload indicator within the predetermined time period, and the transmitted overload indicator is received by the user equipment (UE) within the predetermined time period in step S108.

In step S109, the base station (NodeB) of the serving cell transmits the downlink L1/L2 control signal to the user equipment (UE) and as a result, the transmission of the uplink data signal based on the scheduling information included in the downlink L1/L2 control signal is permitted. Further, the second offset $\Delta_{data}$ is included in the downlink L1/L2 control signal as a part of the scheduling information or the information other than the part of the scheduling information.

In step S110, the value of the third offset $\Delta_{offset}$ is updated, and based on the updated third offset $\Delta_{offset}$ the transmission power of the uplink data signal is determined according to the following formula:

$$P_{data} = P_{ref} + \Delta_{data} + \Delta_{offset}$$

where the symbol $P_{ref}$ denotes the latest transmission power value of the uplink reference signal. In this case, since the user equipment (UE) has received the overload indicator in step S108, the third offset $\Delta_{offset}$ is updated so as to be reduced by a unit power $\Delta_{down}$. Therefore, in step S110, the value of third offset $\Delta_{offset}$ stored in the memory is −2 unit power (i.e., $\Delta_{offset}$=−1−1=−2).

In step S111, the user equipment transmits the uplink data signal at the power value of $P_{data}$ determined in step S110. The uplink data signal is transmitted to the base station of the serving cell and is received by the base station of the neighboring cell as interference power. In this example, since the interference power does not exceed the predetermined permitted value, the base station (NodeB) of the neighboring cell does not transmit the overload indicator within the predetermined time period, and therefore the transmitted overload indicator is not received by the user equipment (UE) within the predetermined time period.

In step S112, the base station (NodeB) of the serving cell transmits the downlink L1/L2 control signal to the user equipment (UE) and as a result, the transmission of the uplink data signal based on the scheduling information included in the downlink L1/L2 control signal is permitted. Further, the second offset $\Delta_{data}$ is included in the downlink L1/L2 control signal as a part of the scheduling information or the information other than the part of the scheduling information.

In step S113, the value of the third offset $\Delta_{offset}$ is updated, and based on the updated third offset $\Delta_{offset}$ the transmission power of the uplink data signal is determined according to the following formula:

$$P_{data} = P_{ref} + \Delta_{data} + \Delta_{offset}$$

where the symbol $P_{ref}$ denotes the latest transmission power value of the uplink reference signal. This time, since the user equipment (UE) has not received the overload indicator, the third offset $\Delta_{offset}$ is updated so as to be increased by a unit power $\Delta_{up}$. For explanation purposes, it is assumed that the value of $\Delta_{up}$ is 0.5 unit power ($\Delta_{up}$=0.5 unit power). Therefore, in step S113, the value of the third offset $\Delta_{offset}$ stored in the memory is −1.5 unit power (i.e. $\Delta_{offset}$=−1−1+0.5=−1.5).

In step S114, the user equipment transmits the uplink data signal at the power value of $P_{data}$ determined in step S113. After that, the same procedure is repeated whenever the uplink data signal is transmitted.

Regarding steps S106, S110, and S113, it is described that the update of the third offset $\Delta_{offset}$ and the determination (calculation) of the transmission power $P_{data}$ of the uplink data signal are performed in the same step. However, this is not essential to the present invention because the update of the third offset $\Delta_{offset}$ can be carried out any time as long as the predetermined time period has elapsed.

In this embodiment of the present invention, whether the third offset $\Delta_{offset}$ is to be updated (increased or decreased) is determined depending on whether the user equipment receives the overload indicator after the uplink data signal is transmitted. Because of this feature, the update of the third offset $\Delta_{offset}$ may not be carried out regularly and the value of the third offset $\Delta_{offset}$ may be maintained at the same value for a relatively long period. If the same value of the third offset $\Delta_{offset}$ is maintained for an excessively long period, the third offset $\Delta_{offset}$ value which is not adequate for the latest communication environment may be used when the next uplink data signal is transmitted. From the viewpoint of reducing this concern, when the value of the third offset $\Delta_{offset}$ is maintained at the same value for a period longer than a predetermined threshold time period, the absolute value of the third offset $\Delta_{offset}$ ($|\Delta_{offset}|$) may be decreased so as to decrease the adjustable amount determined by the third offset $\Delta_{offset}$. For example, if the value of the third offset $\Delta_{offset}$ ($\Delta_{offset}$=−1.5) determined in step S113 is maintained for a period longer than a predetermined threshold time period, the value of the third offset $\Delta_{offset}$ ($\Delta_{offset}$=−1.5) may be forcibly changed to −1.0 or the like.

On the other hand, a case is considered where the user equipment receives the uplink data signal many times and also receives the overload indicator each time upon receiving the uplink data signal. In this case, the value of the third offset $\Delta_{offset}$ is decreased many times and as a result, the transmission power value of the uplink data signal may become much lower than the desired transmission power value of the uplink data signal of the user equipment. If the transmission power value of the uplink data channel becomes much lower than the desired value, the receiving quality of the uplink data signal may be lowered. To resolve the problem, the following methods may be used.

Method (1): The MCS (Modulation and Coding Scheme) is determined by considering the number of retransmissions.

When receiving quality of the uplink data signal is lowered, the number of retransmission requests from the base station to the user equipment is likely to be increased. Therefore, if the number of retransmissions becomes more than a predetermined number (e.g., five (5) times), the base station may change the MCS number used for the user equipment from the MCS number derived from the CQI to another MCS number. Basically, the MCS number used for the uplink data signal is derived based on the CQI value indicating the uplink channel quality (i.e., when CQI value is good, the MCS number (e.g., a larger MCS number) representing higher bit rate communications may be derived). According to this method (1), in a case where the CQI value is good but the number of retransmissions becomes large due to an excessive third offset $\Delta_{offset}$ value, the MCS number representing lower bit rate communications than that of the MCS number that is derived based on the CQI value may be used. As a result of using the MCS number for lower bit rate communications, the instantaneous throughput of the data transmission may be temporarily reduced, but that may make it easier to satisfy the predetermined quality level required by the user equipment and reduce the number of retransmission. As a result, it may become possible to increase the overall throughput of the data transmitted.

Method (2): The third offset Δoffset value is reported.

In this method (2), the third offset $\Delta_{offset}$ value is reported from the user equipment to the base station. By doing this, the base station may recognize that the actual transmission power of the user equipment is determined by using the third offset $\Delta_{offset}$. As a result, it may become possible for the base station to determine the second offset $\Delta_{data}$ while recognizing (taking into consideration) that the reported third offset $\Delta_{offset}$ value will be finally added. The third offset $\Delta_{offset}$ may be reported only when the third offset $\Delta_{offset}$ value exceeds a predetermined threshold value or may be reported regularly or on an as-requested basis (on demand). The third offset $\Delta_{offset}$ may be reported by using the absolute value of the third offset $\Delta_{offset}$ or by using a difference value from a predetermined reference value (as a reference value, a fixed value or a value reported in the previous time may be used). Further, the third offset $\Delta_{offset}$ may be reported using the L1/L2 control signal or as a part of the data signal. This method is preferable from the viewpoint of more aggressively controlling the transmission power actually transmitted from the user equipment by the base station of the serving cell to which the user equipment belongs.

The present invention is described above by referring to specific embodiments. However, a person skilled in the art may understand that the above embodiments are described for illustrative purpose only and may think of examples of various modifications, transformations, alterations, changes, and the like. To promote an understanding of the present invention, specific values are used as examples throughout the description. However, it should be noted that such specific values are just sample values unless otherwise described, and any other values may be used. For illustrative purposes, the apparatus according to an embodiment of the present invention is described with reference to the functional block diagram. However, such an apparatus may be provided by hardware, software, or a combination thereof. The present invention is not limited to the embodiment described above, and various modifications, transformations, alteration, exchanges, and the like may be made without departing from the scope and spirit from the present invention.

The present international application claims priority from Japanese Patent Application Nos. 2007-001857 filed on Jan. 9, 2007 and 2007-026183 filed on Feb. 5, 2007, the entire contents of which are hereby incorporated herein by reference.

The invention claimed is:

1. User equipment to be used in a mobile communication system, the user equipment comprising a memory comprising instructions and a processor configured to execute the instructions within the memory to perform the steps of:

providing an uplink reference signal, an uplink data signal, and an uplink control signal;

setting transmission power of the uplink reference signal, transmission power of the uplink data signal, and transmission power of the uplink control signal;

wirelessly transmitting the uplink reference signal having the transmission power, the uplink data signal having the transmission power, and the uplink control signal having the transmission power, transmitting the uplink data signal and the uplink control signal which are scheduled in each subframe and transmitting the uplink reference signal, not in each subframe, only in predetermined subframes, setting the transmission power of the uplink control signal based on the transmission power of the uplink reference signal and a first power offset value setting the transmission power of the uplink data signal based on the transmission power of the uplink reference signal and a second power offset value, transmitting the uplink control signal and the uplink data signal using only allocated specific resource blocks and the uplink reference signal across a wide bandwidth using multiple resource blocks and controlling the transmission power of the uplink control signal based on the first power offset value and the transmission power of the uplink data signal based on the second power offset value, receiving a request from a base station apparatus, and performing transmission power control based on the request at least by adjusting the second power offset value.

2. A communication method used in user equipment in a mobile communication system, the communication method comprising:

providing an uplink reference signal, an uplink data signal, and an uplink control signal;

setting transmission power of the uplink reference signal, transmission power of the uplink data signal, and transmission power of the uplink control signal;

wirelessly transmitting the uplink reference signal having the transmission power, the uplink data signal having the transmission power, and the uplink control signal having the transmission power, transmitting the uplink data signal and the uplink control signal which are scheduled in each subframe and transmit the uplink reference signal, not in each subframe, only in predetermined subframes, setting the transmission power of the uplink control signal based on the transmission power of the uplink reference signal and a first power offset value setting the transmission power of the uplink data signal based on the transmission power of the uplink reference signal and a second power offset value, transmitting the uplink control signal and the uplink data signal using only allocated specific resource blocks and the uplink reference signal across a wide bandwidth using multiple resource blocks and controlling the transmission power of the uplink control signal based on the first power offset value and the transmission power of the uplink data signal based on the second power offset value, receiving a request from a base station apparatus, and performing transmission power control based on the request at least by adjusting the second power offset value.

3. A mobile communication system comprising a base station apparatus and user equipment, wherein the user equipment comprises a memory comprising instructions and a processor configured to execute the instructions within the memory to perform the steps of:

providing an uplink reference signal, an uplink data signal, and an uplink control signal;

setting transmission power of the uplink reference signal, transmission power of the uplink data signal, and transmission power of the uplink control signal;

wirelessly transmitting the uplink reference signal having the transmission power, the uplink data signal having the transmission power, and the uplink control signal having the transmission power, transmitting the uplink data signal and the uplink control signal which are scheduled in each subframe and transmit the uplink reference signal, not in each subframe, only in predetermined subframes, setting the transmission power of the uplink control signal based on the transmission power of the uplink reference signal and a first power offset value setting the transmission power of the uplink data signal based on the transmission power of the uplink reference signal and a second power offset value, transmitting the uplink control signal and the uplink data signal using only allocated specific resource blocks and the uplink reference signal across a wide bandwidth using multiple resource blocks and controlling the transmission power of the uplink control signal based on the first power offset value and the transmission power of the uplink data signal based on the second power offset value, receiving a request from a base station apparatus, and performing transmission power control based on the request at least by adjusting the second power offset value.

* * * * *